United States Patent
Nimmala et al.

(10) Patent No.: US 10,673,541 B2
(45) Date of Patent: Jun. 2, 2020

(54) METHODS, SYSTEMS AND APPARATUS FOR MITIGATING WIRELESS CONNECTION DEGRADATION DUE TO WIRELESS CHARGING

(71) Applicant: APPLE INC., Cupertino, CA (US)

(72) Inventors: Srinivasan Nimmala, San Jose, CA (US); Sethuraman Gurumoorthy, San Jose, CA (US); Vijay Venkataraman, San Jose, CA (US); Vijay Kumar Ramamurthi, Milpitas, CA (US); Srirang A. Lovlekar, Cupertino, CA (US); Lakshmi N. Kavuri, Cupertino, CA (US); Sang Ho Baek, Palo Alto, CA (US); Yifan Zhu, San Jose, CA (US); Karthik Anantharaman, Cupertino, CA (US); Rangakrishna Nallandigal, Santa Clara, CA (US); Sree Ram Kodali, San Jose, CA (US); Adesh Kumar, San Jose, CA (US); Xin Wang, Cupertino, CA (US); Eyad Al-Shemali, Munich (DE); Xiangpeng Jing, Palo Alto, CA (US); Sivaramachandran Ganesan, Sunnyvale, CA (US); Longda Xing, San Jose, CA (US); Jianxiong Shi, Dublin, CA (US); Sami M. Almalfouh, San Jose, CA (US); Zhu Ji, San Jose, CA (US); Johnson O. Sebeni, Fremont, CA (US); Beibei Wang, Cupertino, CA (US); Sunny Arora, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/612,539

(22) Filed: Jun. 2, 2017

(65) Prior Publication Data

US 2018/0351659 A1 Dec. 6, 2018

(51) Int. Cl.
*H04B 15/02* (2006.01)
*H04B 1/10* (2006.01)
(Continued)

(52) U.S. Cl.
CPC .............. *H04B 15/02* (2013.01); *H04B 1/10* (2013.01); *H04B 5/0037* (2013.01);
(Continued)

(58) Field of Classification Search
CPC .... H02J 7/025; H02J 50/12; H02J 2007/0049; H02J 2007/0096; H02J 50/10; H04W 52/241; H04W 52/243; H04B 15/02
See application file for complete search history.

(56) References Cited

U.S. PATENT DOCUMENTS

| 2010/0225272 A1* | 9/2010 | Kirby | H04B 5/00 |
| | | | 320/108 |
| 2011/0249576 A1* | 10/2011 | Chrisikos | H01Q 1/243 |
| | | | 370/252 |

(Continued)

FOREIGN PATENT DOCUMENTS

EP        3 244 542        11/2017

*Primary Examiner* — Alejandro Rivero
(74) *Attorney, Agent, or Firm* — Fay Kaplun & Marcin, LLP

(57) ABSTRACT

Methods, systems and apparatus for a user equipment to mitigate interference in a wireless charging state. The user equipment may determine when the user equipment enters a wireless charging state and, when the user equipment enters the wireless charging state, activate an interference mitigation. The user equipment may further determine when the UE exits the wireless charging state and, when the user equipment exits the wireless charging state, deactivate the interference mitigation.

19 Claims, 11 Drawing Sheets

(51) Int. Cl.
 *H04B 5/00* (2006.01)
 *H02J 7/02* (2016.01)
 *H02J 50/70* (2016.01)

(52) U.S. Cl.
 CPC ............ *H04B 5/0075* (2013.01); *H02J 7/025* (2013.01); *H02J 50/70* (2016.02)

(56) References Cited

U.S. PATENT DOCUMENTS

| | | | | |
|---|---|---|---|---|
| 2012/0207040 | A1* | 8/2012 | Comsa | H04W 72/1215 370/252 |
| 2012/0275362 | A1* | 11/2012 | Park | H04W 74/02 370/311 |
| 2013/0196659 | A1* | 8/2013 | Damji | H04W 52/0225 455/434 |
| 2014/0198640 | A1* | 7/2014 | Suzuki | H04L 47/76 370/230 |
| 2015/0079904 | A1 | 3/2015 | Toncich et al. | |
| 2016/0087732 | A1* | 3/2016 | Wietfeldt | H04B 15/02 455/63.1 |
| 2016/0255639 | A1* | 9/2016 | Chen | H04W 72/02 370/336 |
| 2017/0324484 | A1* | 11/2017 | Saada | H04B 1/1027 |

\* cited by examiner

METHODS, SYSTEMS AND APPARATUS FOR MITIGATING WIRELESS CONNECTION DEGRADATION DUE TO WIRELESS CHARGING

BACKGROUND

Wireless charging is a way to charge electronic devices without the need for physically connecting the electrical devices to a power outlet. Wireless charging, or inductive charging, uses electromagnetic fields to transfer electric charge from a wireless charging station to a battery of an electronic device.

However, the electromagnetic fields that are used to transfer the charging energy to the electronic device may also interfere with the operation of the electronic device. For example, the electronic device may be connected to a wireless network (e.g., cellular network, local area network ("LAN"), WiFi network, etc.) while it is charging. The electromagnetic fields experienced by the electronic device while charging may interfere with these wireless connections.

SUMMARY

Described herein are methods, systems and apparatus for detecting cellular degradation due to wireless charging. In a first aspect, a method is disclosed where a user equipment may determine when the user equipment enters a wireless charging state and, when the user equipment enters the wireless charging state, activate an interference mitigation. The user equipment may further determine when the UE exits the wireless charging state and, when the user equipment exits the wireless charging state, deactivate the interference mitigation.

In a second aspect, a user equipment is disclosed. The user equipment may have a detection application configured to determine when the user equipment enters a wireless charging state and when the user equipment exits the wireless charging state. The user equipment may further have a processor configured to activate an interference mitigation when it is determined that the user equipment entered the wireless charging state and deactivate the interference mitigation when it is determined that the user equipment exited the wireless charging state.

In a third aspect, an integrated circuit is disclosed. The integrated circuit may have circuitry to determine when a user equipment enters a wireless charging state and circuitry to activate an interference mitigation when it is determined that the user equipment entered the wireless charging state. The integrated circuit may further have circuitry to determine when the user equipment exits the wireless charging state and circuitry to deactivate the interference mitigation when it is determined that the user equipment exited the wireless charging state.

DETAILED DESCRIPTION

Figure 1:
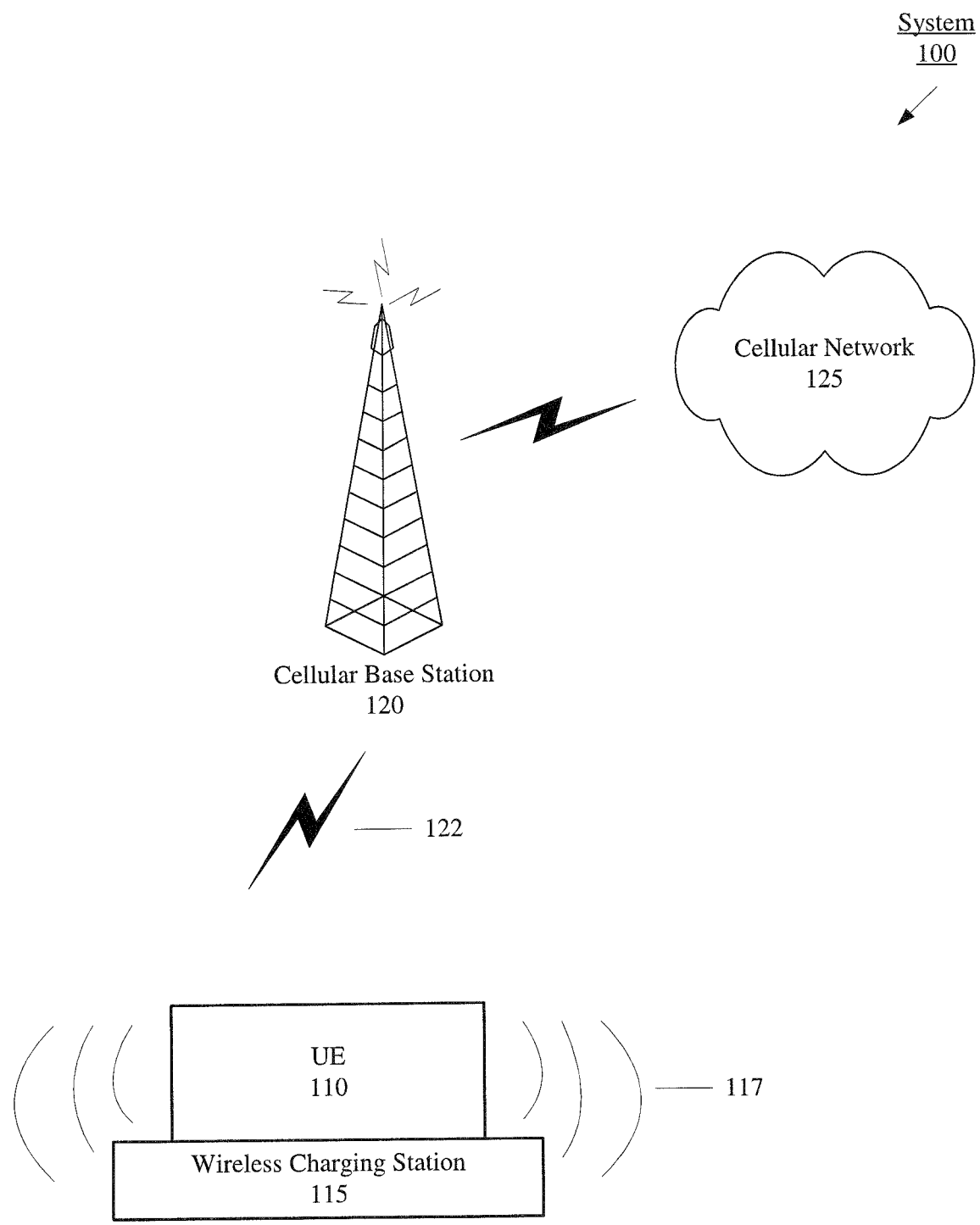
FIG. 1 shows a system arrangement according to various exemplary embodiments described herein.

The exemplary embodiments may be further understood with reference to the following description and the appended drawings, wherein like elements are referred to with the same reference numerals. The exemplary embodiments describe an apparatus, system and method for detecting and mitigating radio frequency ("RF") degradation within a mobile device, such as a user equipment ("UE"), due to wireless charging. In the exemplary embodiments, the mobile device will be described as a UE connected to one or more wireless networks. However, it will be understood by those skilled in the art that the mobile device may be any type of wireless device that supports both wireless charging and wireless data connections in accordance with the functionalities and principles described herein. In addition, the exemplary embodiments will be described with reference to the UE being connected to a cellular network. However, those skilled in the art will understand that the wireless charging may interfere with any network connection of the UE and the exemplary embodiments may be implemented to mitigate the effects of the wireless charging when the UE is connected to any type of network.

As noted above, wireless charging uses electromagnetic fields to transfer an electric charge from a wireless charging station to the UE. The electromagnetic field used to transfer the energy to the UE may interfere with RF waves being transmitted or received by the UE. Throughout the description, the term "RF waves" or "RF signal" will be used to describe any signal exchanged between the UE and a network or device to which the UE is wirelessly connected. The RF waves are distinguished from the electromagnetic field and corresponding effects caused by the wireless charging. The level of RF degradation may depend on a variety of factors, such as the relative orientation of the UE with respect to the wireless charging station, the strength or frequency of the RF signal, etc. The RF degradation may result in poor signal quality for the RF signals transmitted or received by the UE, which may compromise the UE's cellular functionality and may result in dropped or missed calls, poor user data throughput, a poor user experience, etc. As such, the exemplary embodiments will describe methods of mitigating RF degradation/interference when the UE is utilizing the wireless charging station, as well as methods for quickly recovering a connection to the wireless network upon removal of the UE from the wireless charging station.

FIG. 1 shows an exemplary system arrangement 100, according to various embodiments described herein. The exemplary system arrangement 100 includes a UE 110 that is located on a wireless charging station 115 and has a connection to a cellular base station 120 of a cellular network 125. Those skilled in the art will understand that the UE 110 may be any type of electronic component that is configured to communicate via a network, e.g., smartphones, tablets, phablets, embedded devices, wearables, Internet of Things (IoT) device, etc. It should also be understood that an actual network arrangement may include any number of UEs. The example of one (1) UE 110 is only provided for illustrative purposes.

The UE 110 may be positioned on the charging station 115. Those skilled in the art will understand that the charging station 115 may be any type of electronic component that is configured to wirelessly charge the UE 110 through inductive charging. Inductive charging may use an electromagnetic field to transfer energy between the wireless charging station 115 and the UE 110. The wireless charging station 115 may be freestanding or a structure mounted pad or base of any shape or assembly that can accommodate the UE 110 for charging purposes. An exemplary electromagnetic field 117 generated by the wireless charging station 115 is shown in FIG. 1.

The UE 110 may be configured to wirelessly communicate directly with one or more cellular networks 125. For example, the cellular networks with which the UE 110 may communicate may be a legacy radio access network ("RAN"), a Long Term Evolution ("LTE") radio access network ("LTE-RAN"), a wireless local area network ("WLAN") etc. In this example, it may be considered that the cellular network 125 is an LTE-RAN and the cellular base station 120 is an eNodeB (eNB). However, it should be understood that the UE 110 may also communicate with any type of network using any type of cellular base station(s) 120 (e.g., NodeBs, eNodeBs, HeNBs, access points, etc). FIG. 1 also shows the RF signals 122 exchanged between the UE 110 and the cellular base station 120 that are subject to the RF degradation due to the electromagnetic field 117.

Figure 2:
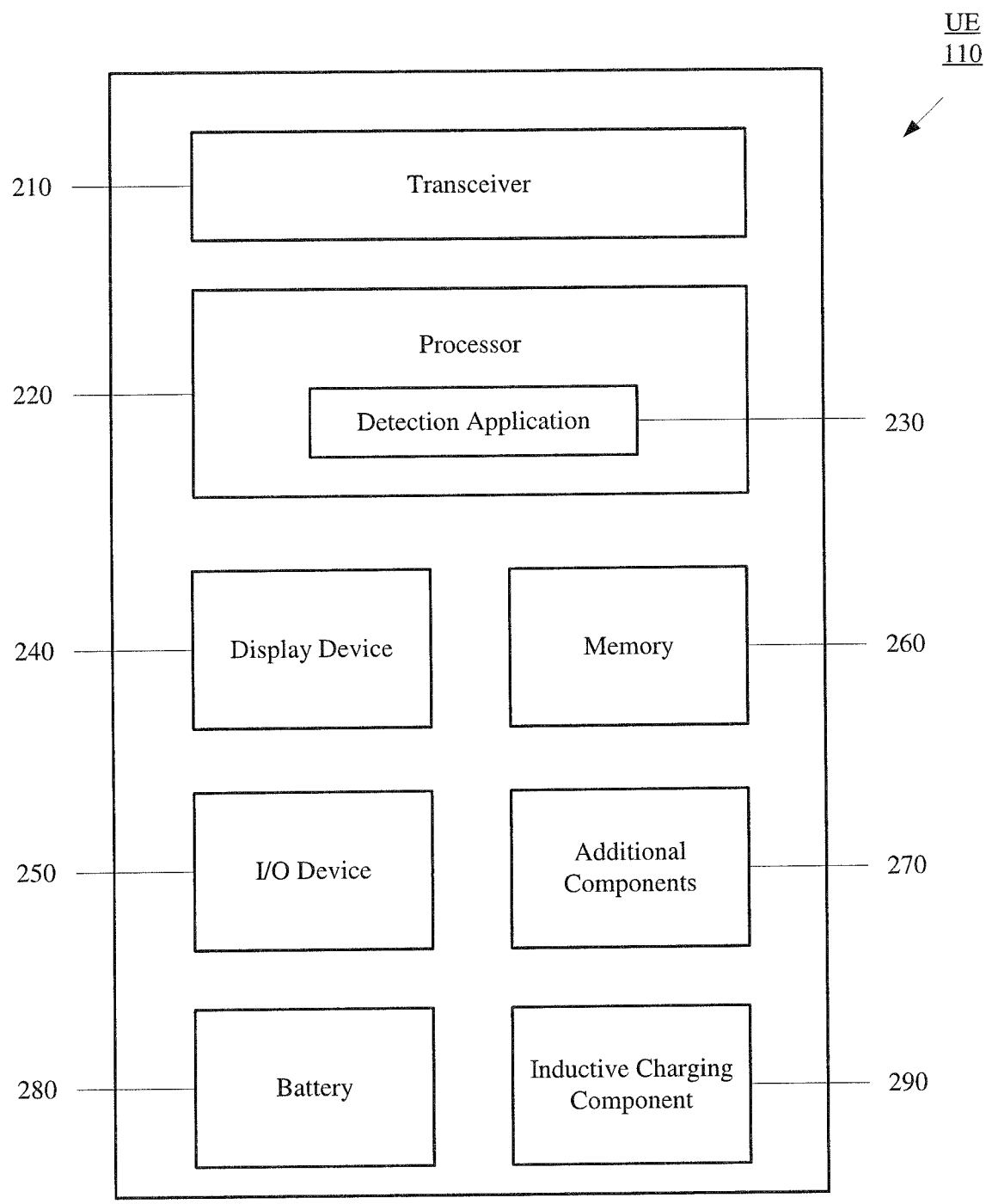
FIG. 2 shows a user equipment according to various exemplary embodiments described herein.

FIG. 2 shows an exemplary UE 110 according to various exemplary embodiments described herein. As described above, the UE 110 may represent any electronic device that is configured to perform wireless charging and wireless communications. The UE 110 may include an antenna (not shown) connected to a transceiver 210, which is connected to a processor 220, which may execute a detection application 230. Those skilled in the art will understand that the processor 220 may be incorporated in, for example, an integrated circuit or chip. The UE 110 may further include a battery 280 (or any other component that stores a charge such as a super capacitor, etc.) The UE 110 may further include a display device 240, an I/O device 250, a memory arrangement 260, and an inductive charging component 290 that may be used to charge the battery 280 via the wireless charging station 115. The UE 100 may also include additional components 270, such as, a Bluetooth transceiver, further input devices (e.g., a keypad, a touchscreen, etc.), etc.

While the exemplary embodiments show the inductive charging component 290 as an internal part of the UE 110, those skilled in the art would understand that the inductive charging component 290 may be an external component as well. For example, the inductive charging component may be an accessory or part of an accessory (e.g., protective case, shell, skin, holster, etc.) attachable to the UE 110.

The processor 220 may be used to perform operations such as, but not limited to, processing input from a user, performing functions of the detection application 230, or communicating with the inductive charging component 290. It should be noted that the exemplary embodiments are described as being performed by the processor 220 and the detection application 230. However, either of these components may perform the described functionalities without the other component. In addition, other components may also perform some or all of the functionalities described herein. The processor 220 and the transceiver 210 may be, for example, general purpose processors, a digital signal processor, an application specific integrated circuit ("ASIC"), another type of integrated circuit and these processors and integrated circuits may execute software programs or firmware.

In some exemplary embodiments, the processor 220 may include multiple processors such as an application processor and a baseband processor. The functionalities described herein may be performed by either or both of these type of processors.

The following exemplary embodiments will describe various methods of mitigating interference experienced by the UE 110 that is caused by the charging station 115. The exemplary embodiments may refer to the UE 110 as entering/being in a wireless charging state or exiting the wireless charging state. It should be understood that the UE 110 being in the wireless charging state may refer to the UE 110 having an inductive, wireless connection with the charging station 115. For example, a user may place the UE 110 on the charging station 115, where the inductive charging component 290 may indicate to the detection application 230 that the UE 110 is wirelessly connected to the charging station 115. In another example, the detection application 230 may determine that the UE 110 is wirelessly connected to the charging station 115 through other means. For example, the detection application 230 may determine that the UE 110 is in a wireless charging state by determining that the battery of the UE 110 is charging while there is no detected corded connection to a connector port of the UE 110.

It should also be understood that the UE 110 exiting the wireless charging state may refer to the discontinuance of the inductive charging of the UE 110. In a first example, the user may remove the UE 110 from the charging station 115. In a second example, the charging station 115 may be turned off manually, automatically or remotely. In any case, the UE 110 would no longer be subject to interference caused by the charging station 115.

It should further be noted that some of the following exemplary embodiments may be utilized only when the UE 110 is in an idle mode or a connected mode, while some of the following exemplary embodiments may be utilized regardless of whether the UE 110 is in the idle mode or the connected mode. Those skilled in the art would understand that an example of an idle mode and a connected mode are the radio resource control ("RRC") layer RRC_Idle and RRC_Connected modes of the UE. Other types of networks may have corresponding modes that are termed differently. However, in general, the idle mode may have a minimal power consumption in which limited operations are performed (e.g., listening for pages). The connected mode may include using a channel for a variety of reasons, including the exchange of data via RF signals.

While it is not possible to generalize all of the exemplary embodiments of the interference mitigations described below, the interference mitigations may be categorized as follows: 1) interference mitigations implemented in the protocol stack; 2) interference mitigations in the physical layer; and 3) user intervention interference mitigations. In addition, a common theme that runs through many (but not all) of the exemplary interference mitigations is that contrary to most normal operations of the UE 110, power conservation is not a major concern. That is, many of the interference mitigations that are described below draw more power than the UE 110 normally uses for operations when not in the wireless charging state. However, this extra power drawn is not a major concern because the UE 110 is charging and the extra power is available. Another manner of stating the above is that when balancing power draw versus enhancement in signal quality and or service quality in the charging state, the scales are weighted on the side of enhancements in signal quality and/or service quality by implementing the exemplary interference mitigations.

Mitigations Implemented in a Protocol Stack of the UE

A protocol stack is an implementation of a computer networking protocol suite where network protocol layers work together. The following describes exemplary interference mitigations that may be implemented in the protocol stack of the UE 110 in response to the interference caused by the charging station 115. The protocol stack interference mitigations may enable the UE 110 to stay in service with the cellular base station 120 as well as make attempts to reconnect with the cellular base station 120 as quickly as possible when the UE 110 exits the wireless charging state.

A first example of a protocol stack interference mitigation when the UE 110 is in the wireless charging state may include deactivating motion sensor based searching while the UE 110 is in the wireless charging state. Motion sensor based searching may involve the UE 110 using a motion protocol to determine whether to switch the UE 110 to a different RAT/frequency/band/network. For example, when the UE 110 is stationary, the motion protocol of the UE 110 may determine that any interference or fluctuations in signal strength are likely temporary. Thus, the UE 110 either would not search for or would not switch to a different RAT, band, or frequency, or would delay taking such actions. When the UE 110 is in motion, the motion protocol of the UE 110 may determine that any interference or fluctuations in signal strength may be due to the motion of the UE 110, thereby enabling different operations such as switching the UE 110 to a different RAT/frequency/band/network. When the UE 110 is in the wireless charging state, interference from the electromagnetic waves of the charging station 115 would be constant, but since the UE 110 is not in motion, the motion protocol may delay the UE 110 from switching to a different RAT/frequency/band/network because the interference experienced by a stationary UE 110 may be regarded as temporary. Therefore, by deactivating the motion sensor based searching of the UE 110, the delay of measuring or switching to a different or neighbor RAT/frequency/band/network due to the motion protocol is mitigated.

Figure 3:
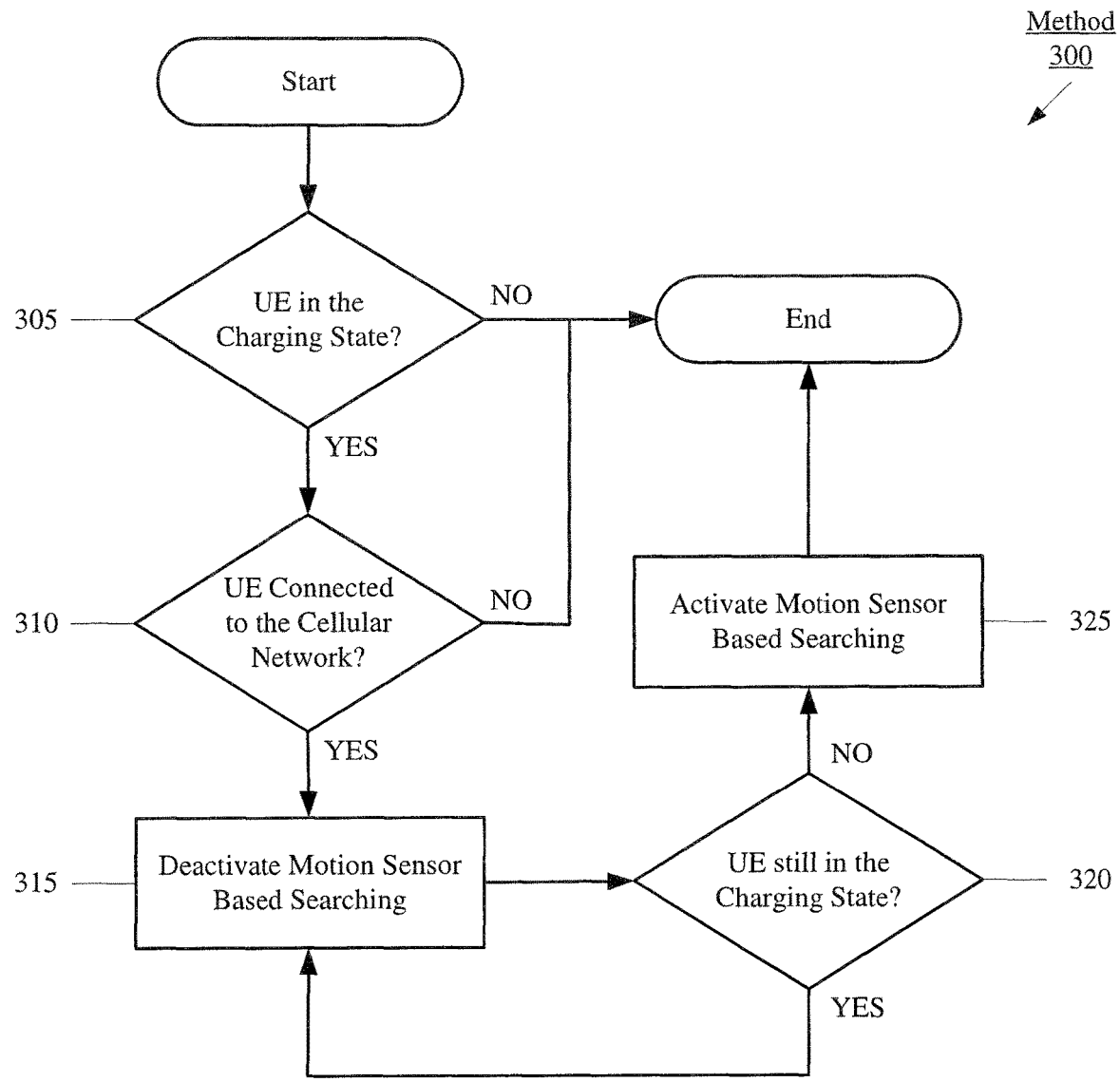
FIG. 3 shows an exemplary method for protocol stack interference mitigation according to various exemplary embodiments described herein.

FIG. 3 shows a first exemplary method for protocol stack interference mitigation according to various embodiments described herein. Specifically, FIG. 3 shows a method 300 for deactivating motion sensor based searching while the UE 110 is in the wireless charging state.

In 305, it is determined whether the UE 110 is in the wireless charging state. As discussed above, the detection application 230 may make this detection based on any number of factors, including receiving a signal from the inductive charging component 290, determining that the battery 280 is charging without a hardwired connection, etc. If it is determined that the UE 110 is in the wireless charging state, the method 300 may proceed to 310.

In 310, it is determined whether the UE 110 is currently connected to the cellular network 125. For example, the processor 220, and more specifically the baseband processor of the UE 110, will know if it has a current connection to the cellular network 125. If either 305 or 310 are determined to be "no", the method 300 may end. However, in 310, if it is determined that the UE 110 is connected to the cellular network 125, the method 300 may proceed to 315.

In 315, the UE 110 may deactivate the motion sensor based searching. As discussed above, by deactivating the motion sensor based searching of the UE 110, the interference of the electromagnetic waves of the charging station 115 would not be incorrectly interpreted as temporary by the motion protocol. That is, when determining whether to search for a different RAT/frequency/band/network the UE 110 will not consider whether the UE 110 is currently stationary or in motion. Thus, any delay of measuring or switching to a different or neighbor RAT/frequency/band/network due to the motion protocol is mitigated while the UE 110 is in the wireless charging state.

In 320, it is determined whether the UE 110 is still in the wireless charging state. If so, the method 300 keeps the motion sensor based searching deactivated by looping to 315. If the UE is no longer in the wireless charging state (e.g., the user removed the UE 110 from the charging station 115), the method 300 proceeds to 325.

In 325, the UE 110 may activate the motion sensor based searching. Specifically, the UE 110 may activate any or all motion protocols that were deactivated in 315. It should be noted that 325 may also activate motion protocols that were deactivated for other reasons.

Another example of the protocol stack interference mitigation when the UE 110 is in the wireless charging state may include deactivating a broadcast control channel ("BCCH") read early timeout. Specifically, the BCCH read early timeout may include optimizing a timeout timer of the BCCH when the UE 110 fails to decode a received master information block ("MIB") and/or a system information block ("SIB"). By optimizing the timeout timer, the UE 110 may conserve the life of the battery 280 because the UE 110 will not continuously attempt to decode the MIBs and SIBs transmitted in the BCCH of the cell after a failure. In contrast, when the UE 110 is charging, power consumption is not an issue because multiple MIB and SIB decode attempts will not deplete the battery 280 of the UE 110. Thus, the BCCH read early timeout may be deactivated. The UE 110 may deactivate the BCCH read early timeout when the UE 110 is in the wireless charging state and when no further suitable cells are available. That is, the UE 110 will continuously attempt to decode the MIBs and SIBs of the connected cell because it is the only cell available. By deactivating the BCCH read early timeout, the UE 110 may improve its MIB and SIB decoding success rate, particularly when the UE 110 is on the LTE network.

Figure 4:
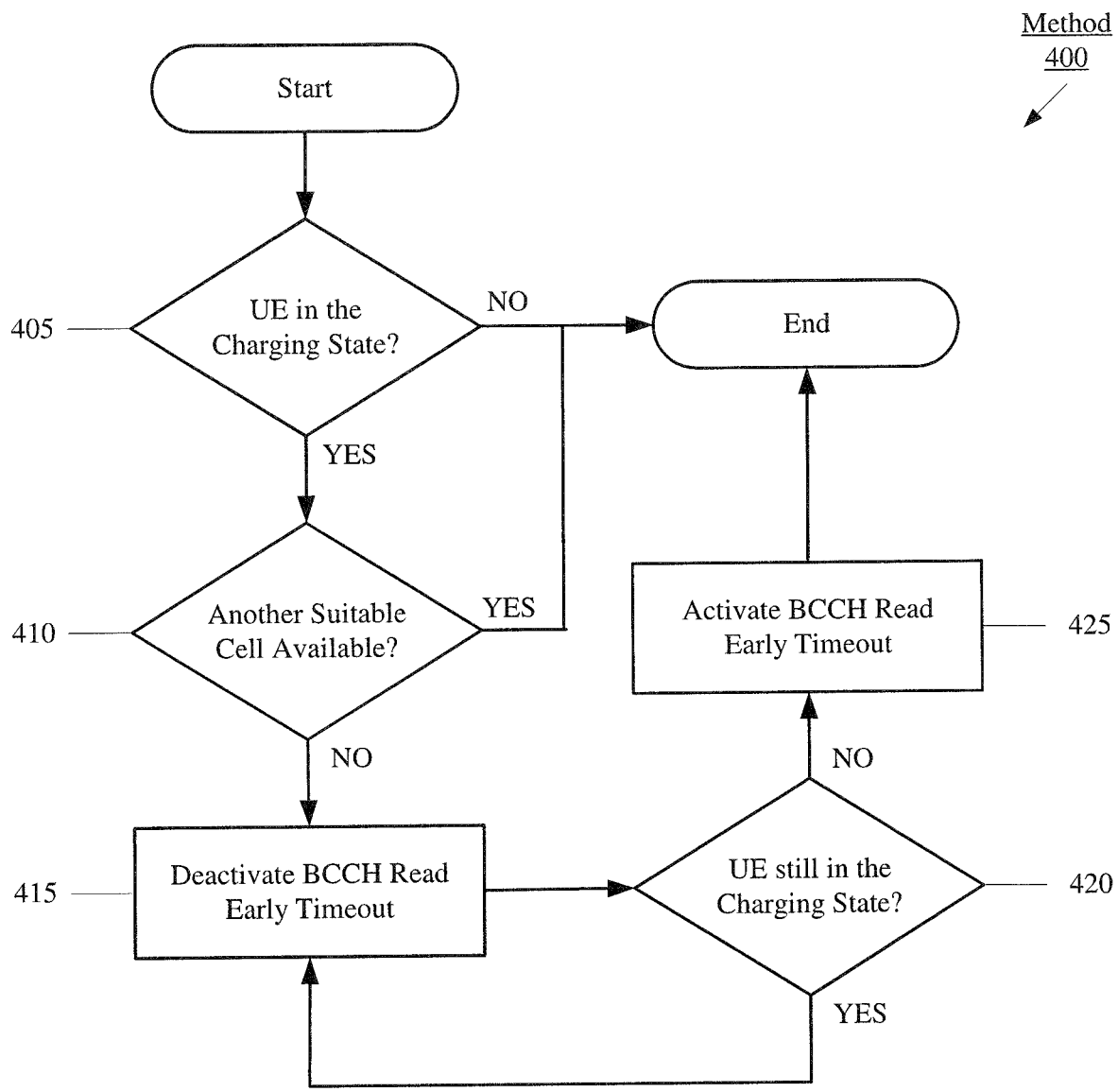
FIG. 4 shows an exemplary method for protocol stack interference mitigation according to various exemplary embodiments described herein.

FIG. 4 shows a second exemplary method for protocol stack interference mitigation according to various embodiments described herein. Specifically, FIG. 4 shows a method 400 for deactivating the BCCH read early timeout while the UE 110 is in the wireless charging state.

In 405, it is determined whether the UE 110 is in the wireless charging state. As discussed above, the detection application 230 may make this detection based on any number of factors, including receiving a signal from the inductive charging component 290, determining that the battery 280 is charging without a hardwired connection, etc. If the UE 110 is not in a charging state, the method 400 may end. If it is determined that the UE 110 is in the wireless charging state, the method 400 may proceed to 410.

In 410, it is determined whether a suitable cell is available for the UE 110 to camp on, other than the cell currently camped on by the UE 110. For example, the processor 220, and more specifically the baseband processor of the UE 110, may check for any cells within range and determine whether the cells within range are suitable for the UE 110 to camp on. If it is determined that there is another suitable cell for the UE to camp on, the method 400 may end. However, if it is determined that there are no other suitable cells for the UE 110 to camp on, the method 400 may proceed to 415.

In 415, the UE 110 may deactivate the BCCH read early timeout. As discussed above, by deactivating the BCCH read early timeout of the UE 110, the UE 110 may improve its MIB and/or SIB decoding success rate for the currently camped on cell because there will be more attempts at the decode. In addition, since the UE 110 is currently charging, there are no adverse effects on battery drain caused by the multiple attempts.

In 420, it is determined whether the UE 110 is still in the wireless charging state. If so, the method 400 keeps the BCCH read early timeout deactivated by looping to 415. If the UE is no longer in the wireless charging state (e.g., the user removed the UE 110 from the charging station 115), the method 400 proceeds to 425. In 425, the UE 110 may activate the BCCH read early timeout, which was deactivated in 415.

A further example of the protocol stack interference mitigation when the UE 110 is in the wireless charging state may include deactivating Universal Mobile Telecommunications Service ("UMTS") cell avoidance. In normal operations, UMTS cell avoidance may involve barring a cell in the cellular network 125 for a predetermined duration (e.g., a bar timer). The cell may be barred if a first value of a first parameter exceeds at least one predetermined threshold. For example, the cell may be barred if a number of radio resource control ("RRC") connection establishment failures exceeds a threshold (e.g., 96 attempts). In a further example, the cell may be barred if the first value of the first parameter exceeds the first threshold and a second value of a second parameter exceeds a second threshold. For example, the cell may be barred if the number of RRC connection establishment failures exceeds 24 and a number of failed inter-radio access technology ("IRAT") attempts exceeds 2. In another example, the cell may be barred if the number of RCC connection establishment failures exceeds 24 and a number of out of service ("OOS") indications exceeds 2. Those skilled in the art would understand that the above described values and parameters are only exemplary and that any value or parameter may be used when implementing UMTS cell avoidance. For example, different threshold may be used depending on which mode(s) the UE 110 is implementing (e.g., battery saver mode). After the expiration of the bar timer, any barred cells may be placed into a monitor state where access to the cells are allowed until the threshold(s) is exceeded again.

In contrast, when the UE 110 is in the charging state, the UE 110 may deactivate the UMTS cell avoidance so that cells are not barred. By deactivating the UMTS cell avoidance, the UE 110 may increase a probability of getting back in service. This is because the UE 110 may keep trying to connect to a cell(s) whose signals are being interfered with by the electromagnetic fields of the charging station 115. Specifically, with the UMTS cell avoidance being deactivated, the cell(s) will not be blacklisted.

Figure 5:
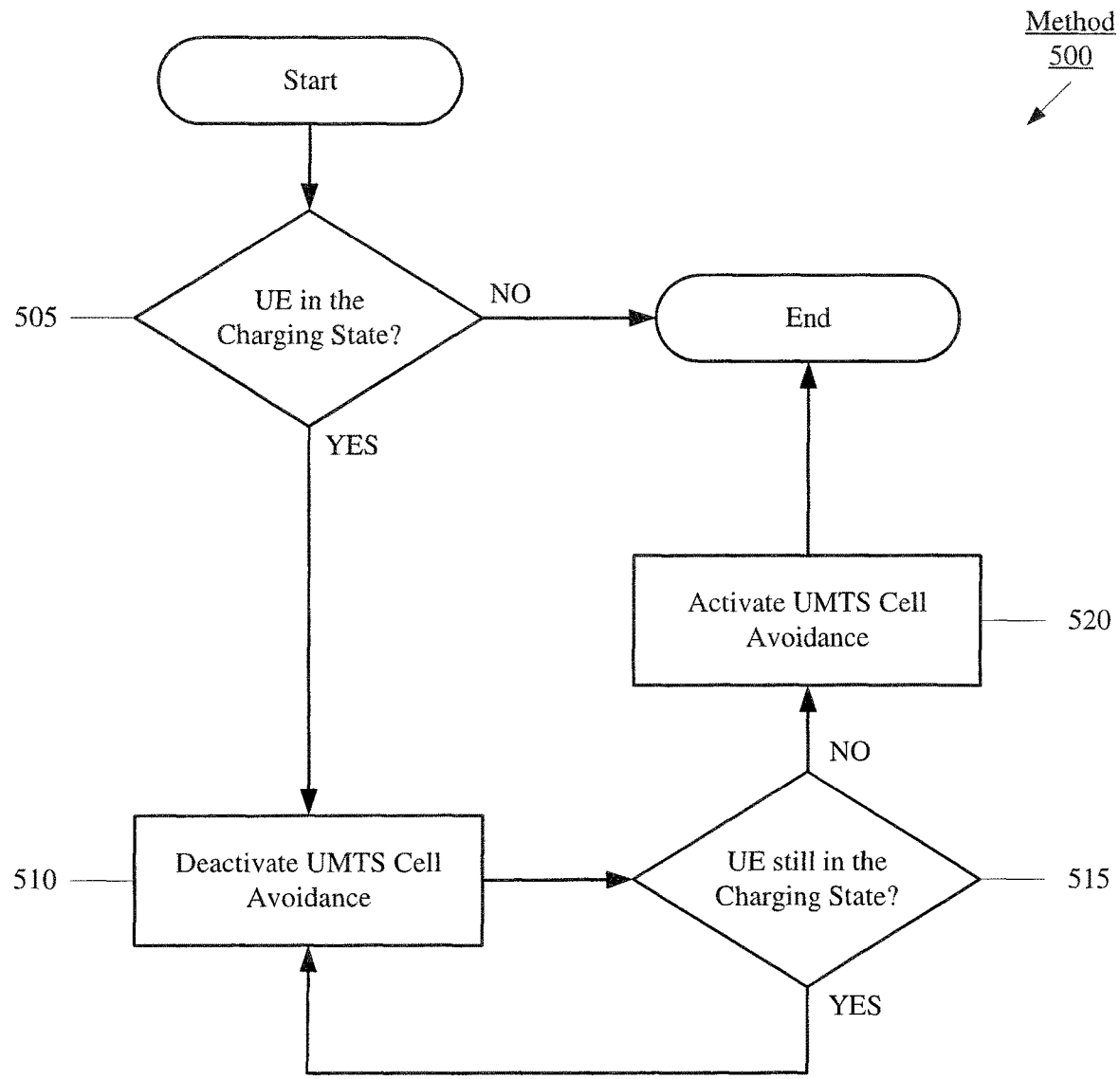
FIG. 5 shows an exemplary method for protocol stack interference mitigation according to various exemplary embodiments described herein.

FIG. 5 shows a third exemplary method for protocol stack interference mitigation according to various embodiments described herein. Specifically, FIG. 5 shows a method 500 for deactivating the UMTS cell avoidance while the UE 110 is in the wireless charging state.

In 505, it is determined whether the UE 110 is in the wireless charging state. If the UE 110 is not in a charging state, the method 500 may end. If it is determined that the UE 110 is in the wireless charging state, the method 500 may proceed to 510.

In 510, the UE 110 may deactivate the UMTS cell avoidance. For example, the UE 110 may not bar a cell when the cell barring thresholds for that cell are triggered. By deactivating the UMTS cell avoidance of the UE 110, the UE 110 may increase the probability of getting back in service since, for example, RRC connection attempts would not be limited.

In 515, it is determined whether the UE 110 is still in the wireless charging state. If so, the method 500 keeps the UMTS cell avoidance deactivated by looping to 510. If the UE is no longer in the wireless charging state, the method 500 proceeds to 520. In 520, the UE 110 may activate the UMTS cell avoidance, which was deactivated in 510.

A further example of the protocol stack interference mitigation when the UE 110 is in the wireless charging state may include altering cell connection parameters of the UE 110. That is, the UE 110 may have (default) connection parameters when attempting to connect to a cell. The connection parameters may pertain to connection establishment failures, connected state radio link failures ("RLFs"), SIB decode failures (mandatory or non-mandatory), etc. If thresholds relating to these connection parameters are triggered by a cell, the cell may be barred (e.g., blacklisted) for a period of time. It should be noted that the terms barred and blacklisted may be used interchangeably throughout this description. In a first example, if the UE 110 experiences a predetermined amount (e.g., 3) of consecutive connection establishment failures on a cell, the cell may be temporarily barred for a predetermined amount of time, such as, for example, 300 seconds. After the predetermined amount of time expires (e.g., 300 seconds), the cell may be unbarred and the UE 110 may be allowed again to attempt to establish a connection to the cell. In a second example, if the UE 110 experiences a predetermined amount (e.g., 6) of connected state RLFs to a cell within a first predetermined amount of time (e.g., 60 second), the cell may be temporarily barred for a second predetermined amount of time (e.g., 300 seconds). After the predetermined amount of time expires (e.g., 300 seconds) the cell may be unbarred. In a third example, if the UE 110 fails to decode a SIB, such as a mandatory SIB, or unable to decode a SIB, such as a non-mandatory SIB, within a number of attempts during a time period (e.g., 5 attempts within 60 seconds), the cell may be temporarily barred for a predetermined amount of time, such as, for example, 30 seconds. After the predetermined amount of time expires (e.g., 30 seconds), the cell may be unbarred. Those skilled in the art would understand that the above values are only exemplary and that any value may be used for any of the above discussed parameters.

When the UE 110 is in the charging state, the barring thresholds may be relaxed so that it is less likely that a cell is barred. By altering the threshold (e.g., the predetermined amounts of time, the attempts, etc.) described above, the UE 110 may be given more opportunity to connect to or maintain connection to the cell. It should be understood that if the altered predetermined amounts of the connection parameters are triggered (e.g., exceed the threshold), the cell may be barred for an original or an altered time period.

Figure 6:
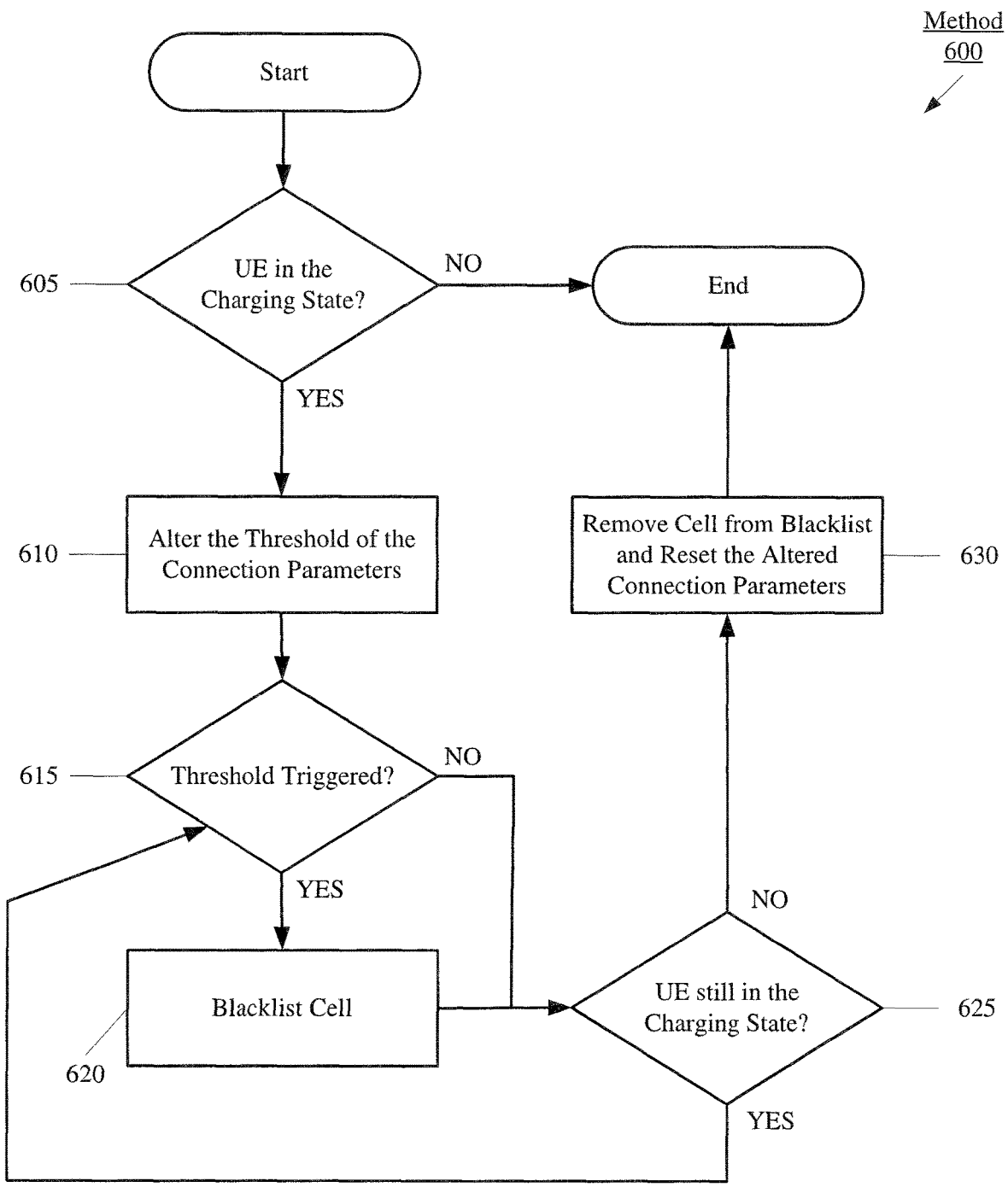
FIG. 6 shows an exemplary method for protocol stack interference mitigation according to various exemplary embodiments described herein.

FIG. 6 shows a fourth exemplary method for protocol stack interference mitigation according to various embodiments described herein. Specifically, FIG. 6 shows a method 600 for altering connection parameters for connecting/maintaining a connection to a cell while the UE 110 is in the wireless charging state.

In 605, it is determined whether the UE 110 is in the wireless charging state. If the UE 110 is not in a charging state, the method 600 may end. If it is determined that the UE 110 is in the wireless charging state, the method 600 may proceed to 610.

In 610, the connection parameters may be altered. Specifically, the processor 220 may alter the thresholds of the connection parameters. As discussed above, connection parameters may include the connection establishment failures, connected state radio link failures ("RLFs"), SIB decode failures, etc. Those skilled in the art would understand that the above connection parameters are only exemplary and that any connection parameter relating to the UE 110 connection to a cell may be used.

In a first example relating to the connection establishment failures, the predetermined amount of consecutive connection establishment failures may be increased (e.g, from 3 to 5) and/or the predetermined amount of time may be reduced (e.g., from 300 seconds to 30 seconds). As such, this would allow for more attempts to establish a connection to the cell.

In a second example, the predetermined amount of connected state RLFs within the first predetermined amount of time may be increased (e.g., from 6 to 8) and/or the barring of the cell for the second predetermined amount of time when the predetermined amount of connected state RLFs exceeds the first predetermined amount of time may be reduced (e.g., 300 second to 30 seconds). As such, this would allow the UE 110 to remain on the cell during more RLFs and/or the time of the cell being barred would be decreased.

In a third example, the number of attempts during the time period for decoding the SIBs may be increased (e.g., 300 seconds to 900 seconds) or eliminated. This would allow the UE more time to decode the SIBs. Again, those skilled in the art would understand that the above examples are only exemplary and that any value may be used for any of the above discussed parameters.

In 615, it is determined whether any thresholds of the altered connection parameters are triggered. For example, 6 consecutive connection establishment failures may have occurred in 28 seconds, thus exceeding the threshold of 5 consecutive connection establishment failures within 30 seconds. If any of the thresholds were triggered, the method 600 may proceed to 620.

In 620, the cell to which the UE 110 is attempting to connect to or maintain a connection with is blacklisted. The cell may be blacklisted for a predetermined amount of time, an altered amount of time, or until the UE 110 exits the charging state.

After 620 or 615, in 625, it is determined whether the UE 110 is still in the wireless charging state. If the UE is still in the wireless charging state, the method 600 returns to 615, where it may again be determined whether any thresholds of the altered connection parameters are triggered. It should be understood that if the predetermined amount of time a cell is blacklisted for expires during the execution of method 600, but before the UE 110 leaves the charging state, the UE 110 may reattempt to connect to the cell. In this case, that cell's thresholds may again be triggered in 615, and the cell may again be blacklisted in 620.

If the UE 110 is no longer in the wireless charging state, the method 600 may proceed to 630. In 630, the UE 110 may remove the cells that were blacklisted in 615 and reset the altered connection parameters to their default values. By removing the cells from the blacklist when the UE 110 exits the charging state, the UE 110 may regain service or connect to a better RAT/frequency/band/network quickly. This is because the source of interference to the blacklisted cells (e.g., the electromagnetic field of the charging station 115) has been removed. Further, by resetting the altered connection parameters to their default values, the power saving methods of the UE 110 prior to entering the charging state are restored.

A further example of the protocol stack interference mitigation when the UE 110 is in the wireless charging state may include activating fast mode measurement. This may allow for the UE 110 to perform re-selections at a faster rate. Specifically, in a normal measurement mode (e.g., when not in the charging state), the UE 110 may search and measure only a subset of frequencies during a discontinuous reception ("DRX") cycle. During fast mode, the UE 110 may measure all enabled frequencies. This may increase the chance of finding an acceptable frequency when the UE 110 is experiencing interference.

Figure 7:
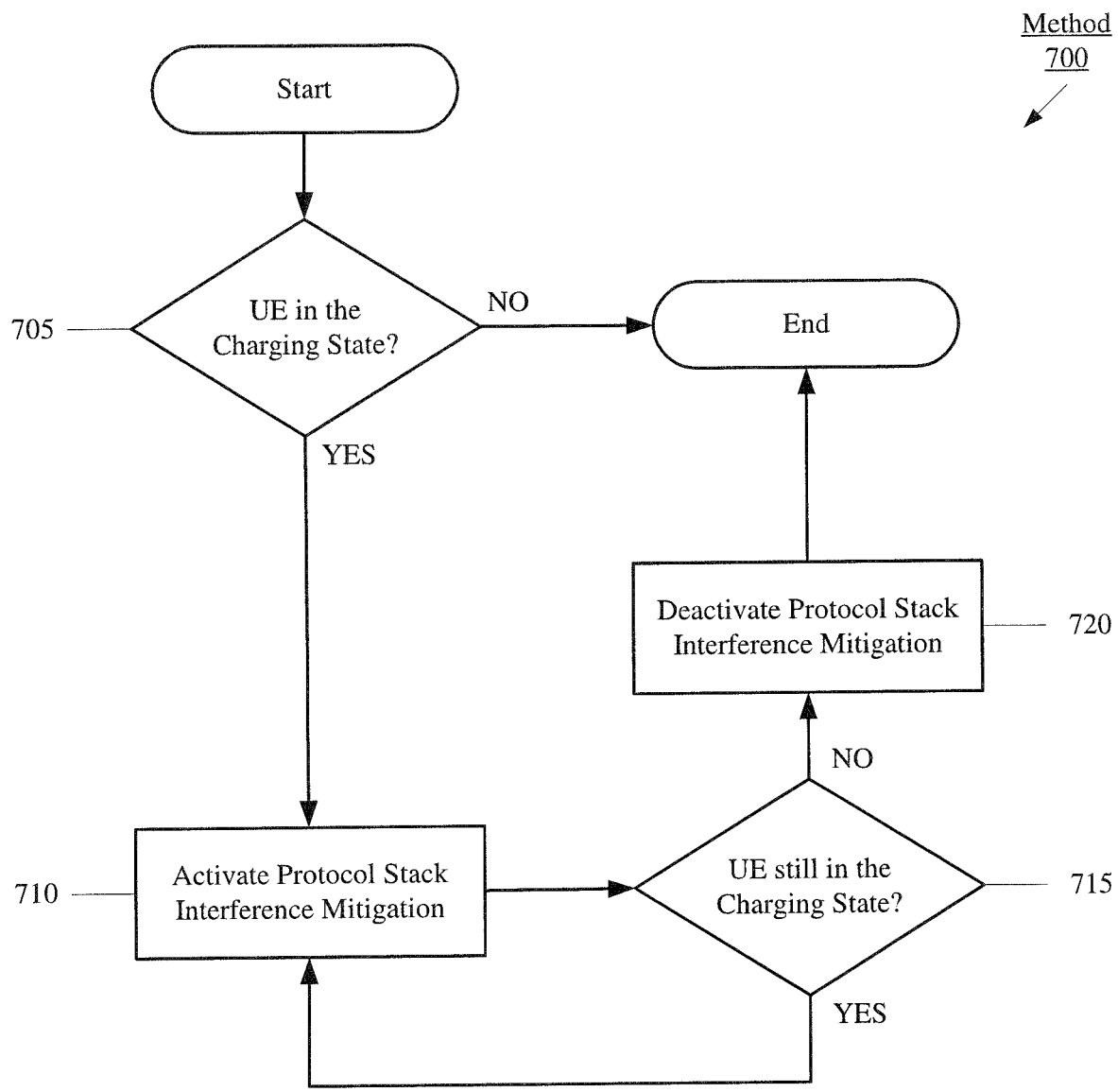
FIG. 7 shows an exemplary method for protocol stack interference mitigation according to various exemplary embodiments described herein.

FIG. 7 shows a fifth exemplary method for protocol stack interference mitigation according to various embodiments described herein. Specifically, FIG. 7 shows a method 700 for activating the protocol stack interference mitigation when the UE 110 enters the charging state and deactivating the protocol stack interference mitigation when the UE 110 exits the charging state. It should be noted that while the method 700 will be in reference to the protocol stack interference mitigation of activating fast mode measurement, the method 700 may be used for any of the protocol stack interference mitigations described herein.

In 705, it is determined whether the UE 110 is in the wireless charging state. If the UE 110 is not in a charging state, the method 700 may end. If it is determined that the UE 110 is in the wireless charging state, the method 700 may proceed to 710.

In 710, the UE 110 may activate the protocol stack interference mitigation. For example, as discussed above, the protocol stack interference mitigation may include activating fast mode measurement. Thus, in 710, the fast mode measurement may be activated. Again, those skilled in the art would understand that any protocol stack interference mitigation may be activated in 710.

In 715, it is determined whether the UE 110 is still in the wireless charging state. If so, the method 700 keeps the protocol stack interference mitigation activated by looping to 710. If the UE is no longer in the wireless charging state, the method 700 proceeds to 720. In 720, the UE 110 may deactivate the protocol stack interference mitigation, which was activated in 710. Again, those skilled in the art would understand that any protocol stack interference mitigation may be deactivated in 720 as described herein.

Another example of a protocol stack interference mitigation that may be activated in 710 may include adjusting an access barring factor. Access barring may be a feature used by the cellular network 125 to reduce congestion by barring a UE or a class of UEs from the network and/or from an aspect of the network (e.g., a specific frequency band.) In one exemplary embodiment, the UE 110 may be assigned a network configured access barring factor. If a random number generated by the UE 110 is lower than the access barring factor, access is allowed. If the number is higher, access to the network 125 by the UE 110 may be barred for a predetermined amount of time. As such, in 710, the UE 110 may add a bias factor to the access barring factor to generate a charging barring factor. For example, if the network assigned access barring factor is 45 and the bias factor is 20, the charging barring factor of the UE 110 may be 65, thus decreasing the probability of the UE 110 being barred by the network 125. Those skilled in the art would understand that the above values are only exemplary and would further understand how to adjust other implementations of access barring factors to decreasing the probability of the UE 110 being barred by the network 125. In another exemplary embodiment, in 710, the UE 110 may eliminate the access barring factor altogether.

A further example of a protocol stack interference mitigation that may be activated in 710 may include removing a RAT, cell or frequency from a deprioritized list. In an exemplary embodiment, the UE 110 or the network 125 may deprioritize at least one of the RATs, cells, or frequencies on which the UE 110 has a decreased chance of camping. By deprioritizing the RATs/cells/frequencies during normal operations, the UE 110 maintains a selection of other RATs, cells and frequencies on which the UE 110 has a good chance of camping. However, in 710, the UE 110 may remove any RATs/cells/frequencies that have been deprioritized. This may increase the chance of the UE 110 camping on any RAT/cell/frequency while in the wireless charging state. Those skilled in the art would understand that, in 720, the UE 110 may re-deprioritize any RAT/cell/frequency that was deprioritized prior to the UE 110 entering the wireless charging state. Those skilled in the art would further understand that the deprioritization of the RAT/cell/frequency may include a timer during which the RAT/cell/frequency is deprioritized. As such, in 710, the timer(s) may be suspended for the duration of the UE 110 remaining in the wireless charging state. Furthermore, in 720, after the UE exits the wireless charging state the timer(s) may be unsuspended.

Another example of a protocol stack interference mitigation that may be activated in 710 may include reducing cell selection criteria if no suitable cells are found. Cell selection criteria may use thresholds such as a minimum required receiver level of a cell (e.g., $Q_{rxlevmin}$) and a minimum required quality level of a cell (e.g., $Q_{qualmin}$). Due to the interference of the charging station 115, the $Q_{rxlevmin}$ and $Q_{qualmin}$ thresholds may be reduced to allow for lower requirements and a greater chance of a connection to a cell. Thus, in 710, the UE 110 may reduce the $Q_{rxlevmin}$ and $Q_{qualmin}$ thresholds.

Another example of a protocol stack interference mitigation that may be activated in 710 may include initiating a fingerprint function. Specifically, the UE 110 may fingerprint a cellular environment from a previous occasion when the UE 110 was in the wireless charging state. For example, during the previous occasion, the UE 110 may have fingerprinted that the UE 110 lost connection to the LTE network and selected the 1× network based on a specific set of metrics (e.g., signal level and cell identity.) As such, in 710, the UE 110 may use the "fingerprint" from the previous occasion when the UE 110 was in the wireless charging state to immediately connect to the 1× network. This may reduce or eliminate a duration that the UE 110 has no service.

Another example of a protocol stack interference mitigation that may be activated in 710 may include increasing an out of service ("OOS") recovery scan rate. By increasing the OOS recovery scan rate, there may be an increased chance of the UE 110 exiting OOS. Those skilled in the art would understand that in 720, the OOS recovery scan rate may return to the level prior to the UE 110 entering the wireless charging state.

Another example of a protocol stack interference mitigation that may be activated in 710 may include changing a lost recovery scan type from a first scan type to a second scan type. Specifically, certain scan types may be more effective but require more power (e.g., battery life.) However, when the UE 110 is charging, power consumption is not an issue. Thus, in 710, for example, the UE 110 may switch from the first type of scan (e.g., most recently used ("MRU") scan) to the second type of scan (e.g., a sector level sweep ("SLS") scan). Those skilled in the art would understand that the above scans are only exemplary and that any type of scan may be used. In 720, the UE 110 may switch back from the second scan to the first scan.

Another example of a protocol stack interference mitigation that may be activated in 710 may include increasing a limited service recovery scan rate. Specifically, the UE 110, may select a limited service cell if there are no normal service cells available. This may occur due to variations in cellular coverage from one carrier to another. When the UE 110 is camped on the limited service cell, the UE 110 may conduct background scans for the normal service cells frequently. Thus, in 710, for example, by increasing the limited service recovery scan rate, there may be an increased chance of the UE 110 finding normal service.

Figure 8:
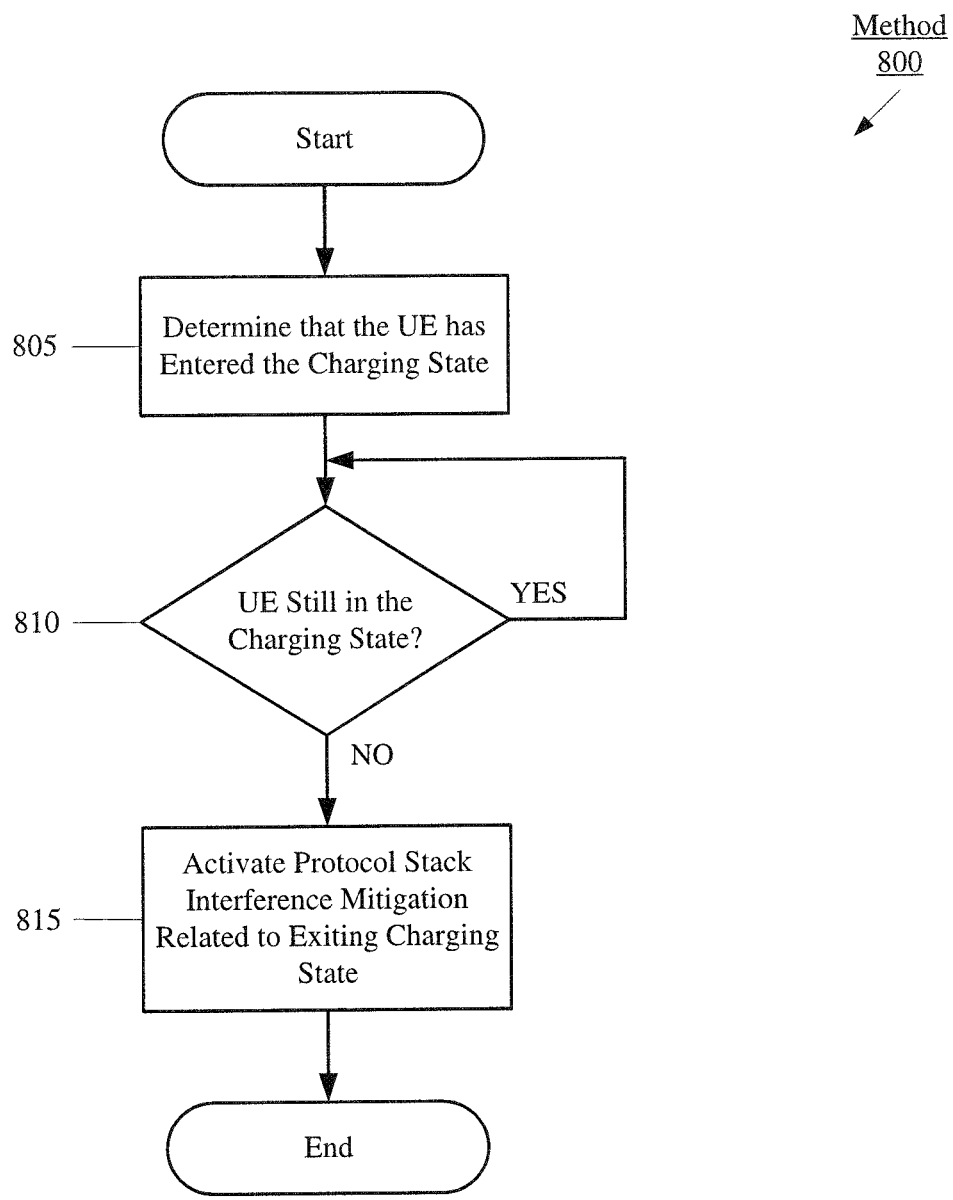
FIG. 8 shows an exemplary method for protocol stack interference mitigation according to various exemplary embodiments described herein.

FIG. 8 shows an exemplary method for protocol stack interference mitigation related to exiting the charging state according to various embodiments described herein. Specifically, FIG. 8 shows a method 700 for activating the protocol stack interference mitigation when the UE 110 exits the charging state, e.g., the UE 110 is removed from the charging station 115. In the above examples, the interference mitigations were described as being implemented when the UE 110 is in the charging state. In contrast, the following interference mitigations are implemented after the UE 110 has exited the charging state. These types of mitigations are designed to allow the UE 110 to regain cellular service as soon as possible after exiting the charging state. It should be noted that the operations described above with reference to 630 of the method 600 may also be considered an interference mitigation implemented after the UE 110 has exited the charging state.

In 805, it is determined that the UE has entered the wireless charging state. As discussed above, the detection application 230 may make this determination based on any number of factors, including receiving a signal from the inductive charging component 290, determining that the battery 280 is charging without a hardwired connection, etc.

In 810, it is determined whether the UE 110 remains in the wireless charging state. If so, the method 800 keeps the looping by repeating 810. If the UE 110 is no longer in the wireless charging state, the method 800 proceeds to 815.

In 815, the UE 110 may activate the protocol stack interference mitigation related to exiting the charging state. In a first exemplary embodiment, the protocol stack interference mitigation related to exiting the charging state includes the UE 110 triggering a quick scan. For example, the quick scan may be a better system reselection ("BSR") type of scan, which may occur while the UE 110 is in the idle state, or a force better system scan, which may suspend an active data transfer in a lower RAT. The quick scan may allow the UE 110 to search for and/or connect to a better RAT/frequency/band/network quickly upon exiting the charging state. Further, quick scans may include a MRU scan and a SLS scan. The quick scan may be particularly helpful in the LTE network.

In a further example, a condition precedent may be used to trigger the quick scan in 815. In a first example, the quick scan may be triggered when the UE 110 exits the charging state and is in an OOS condition. In a second example, the quick scan may be triggered when the UE 110 exits the charging state and the UE 110 is currently camped on a lower priority RAT. Those skilled in the art would understand that other conditions may be used to trigger the quick scan when the UE 110 exits the charging state.

In a second exemplary embodiment, the protocol stack interference mitigation related to exiting the charging state may include removing a throttling timer. A throttling timer may be a duration during which a service request from the UE 110 to the cellular network 125 is barred. The throttling timer may be implemented as a result of the interference generated by the electromagnetic fields of the wireless charging station 115 while the UE 110 is in the charging mode. Alternatively, the throttling timer may be implemented for reasons other than the interference generated by the electromagnetic fields of the wireless charging station 115 while the UE 110 is in the charging mode.

Returning to 815, when the throttling timer is implemented as a result of the interference generated by the electromagnetic fields of the wireless charging station 115, upon exiting the charging state, the UE 110 may remove any of the throttling timers that were implemented due to the interference generated by the electromagnetic fields of the wireless charging station 115. This will allow the UE 110 to generate service requests upon exiting the charging state, thus allowing for the UE 110 to regain service quickly.

In a third exemplary embodiment, the protocol stack interference mitigation related to exiting the charging state includes triggering a high priority public land mobile network ("HP-PLMN") scan. A HP-PLMN timer is a timer that controls the periodicity of the UE 110 to attempt to connect to a HP-PLMN. While the UE 110 is in the charging station, it might have moved onto a low priority PLMN due to the interference caused by the charging station 115 and due to variations in cellular coverage from one carrier to another. At 815, the UE 110 may trigger a HP-PLMN timer expiry event and, thus, immediately initiate a HP-PLMN search.

Figure 9:
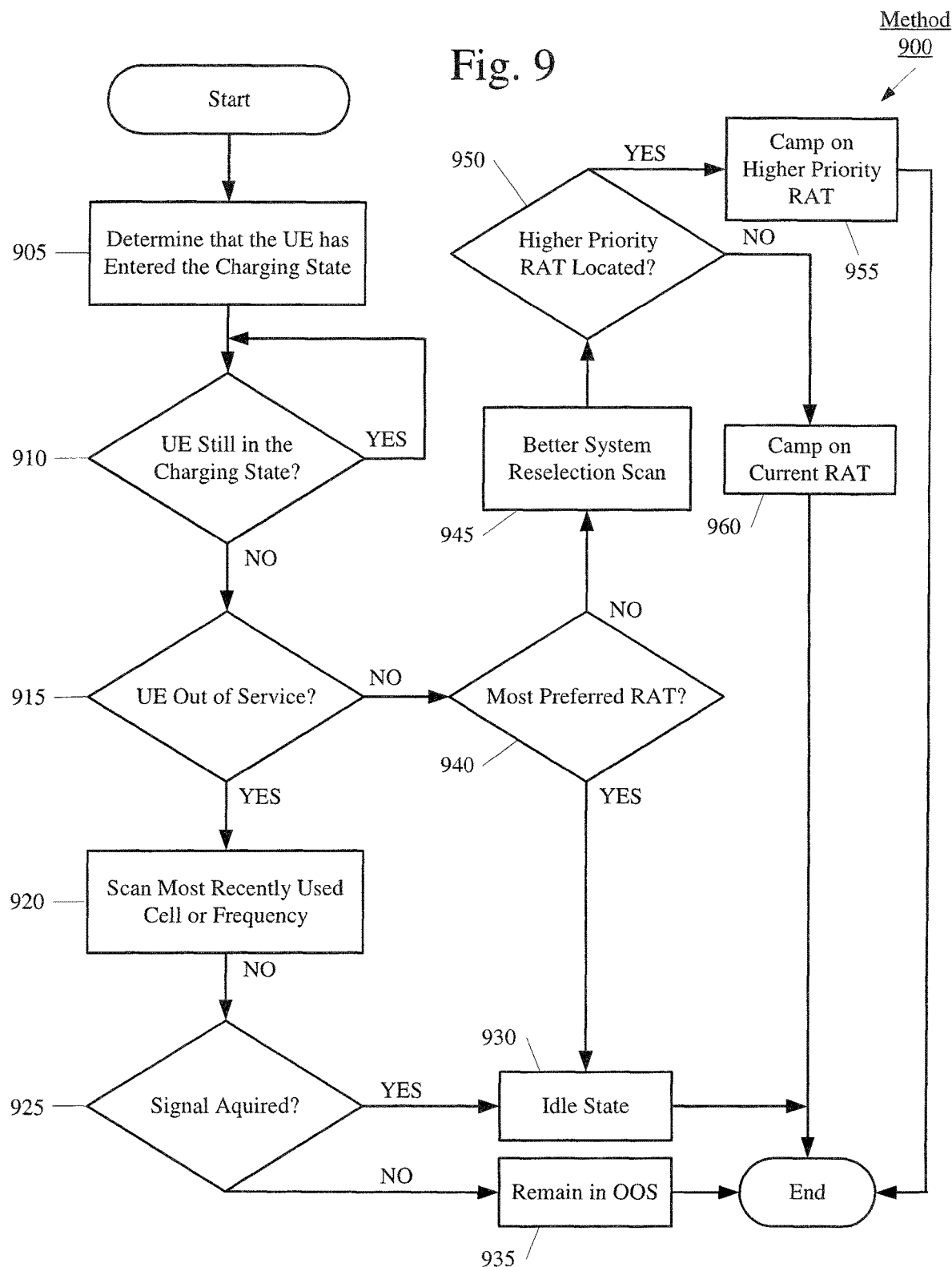
FIG. 9 shows an exemplary method for protocol stack interference mitigation according to various exemplary embodiments described herein.

FIG. 9 shows an exemplary embodiment for implementing multiple protocol stack interference mitigations related to exiting the charging state according to various embodiments described herein. Specifically, FIG. 9 shows a method 900 for determining which of the quick scans described above to perform.

In 905, it is determined that the UE has entered the wireless charging state. In 910, it is determined whether the UE 110 remains in the wireless charging state. If so, the method 900 keeps looping by repeating 910. If the UE 110 is no longer in the wireless charging state, the method 900 proceeds to 915.

In 915, it is determined whether the UE 110 is in the OOS condition. If it is determined that the UE 110 is OOS, the method 900 proceeds to 920. In 920, the UE 110 may scan for a most recently used cell(s) or for a most recently used frequency(ies). Specifically, the UE 110 may perform the MRU or the SLS scan.

In 925, it is determined whether a signal is acquired from the most recently used cell(s) or on the most recently used frequency(ies). If it is determined that the signal has been acquired, the method 900 proceeds to 930, where the UE 110 may enter idle mode and the method 900 may end. If it is determined that the signal has not been acquired, the UE 110 may proceed to 935, where the UE 110 may remain in OOS and the method 900 may end.

Returning to 915, when it is determined that the UE 110 is not in OOS, the method 900 proceeds to 940. In 940, it is determined whether the UE 110 is camping on the most preferred RAT. If it is determined that the UE 110 is camping on the most preferred RAT, the method 900 may proceed to 930, where the UE 110 may enter idle mode and the method 900 may end. If it is determined that the UE 110 is not camping on the most preferred RAT, the method 900 may proceed to 945.

In 945, the UE 110 may perform a BSR scan, as described above. In 950, it is determined whether a higher priority RAT is located. If it is determined that the higher priority RAT has been located, the method 900 proceeds to 955, where the UE 110 may camp on the higher RAT and the method 900 may end. If it is determined that the higher priority RAT has not been located, the UE 110 may proceed to 960, where the UE 110 may camp on the current RAT and the method 900 may end. It should be understood that method 900 is only an exemplary embodiment for illustrative purposes.

Mitigations Implemented in a Baseband/Physical Layer of the UE

The following provides exemplary interference mitigations that may be implemented in at least one of software, hardware or firmware of the baseband processor and/or a physical layer of the baseband processor of the UE 110. Hereafter, exemplary interference mitigations will be referred to as baseband interference mitigations. Similar to the protocol stack interference mitigations, the baseband interference mitigations may enable the UE 110 to stay in service with the cellular base station 120 as well as make attempts to reconnect with the cellular base station 120 as quickly as possible when the UE 110 exits the wireless charging state.

A first example of a baseband interference mitigation when the UE 110 is in the wireless charging state may include any of the protocol stack interference mitigations discussed above. This may include, but is not limited to, deactivating motion sensor based searching, deactivating the BCCH read early timeout, deactivating the UMTS cell avoidance, altering the cell connection parameters of the UE 110 and activating fast mode measurement.

Figure 10:
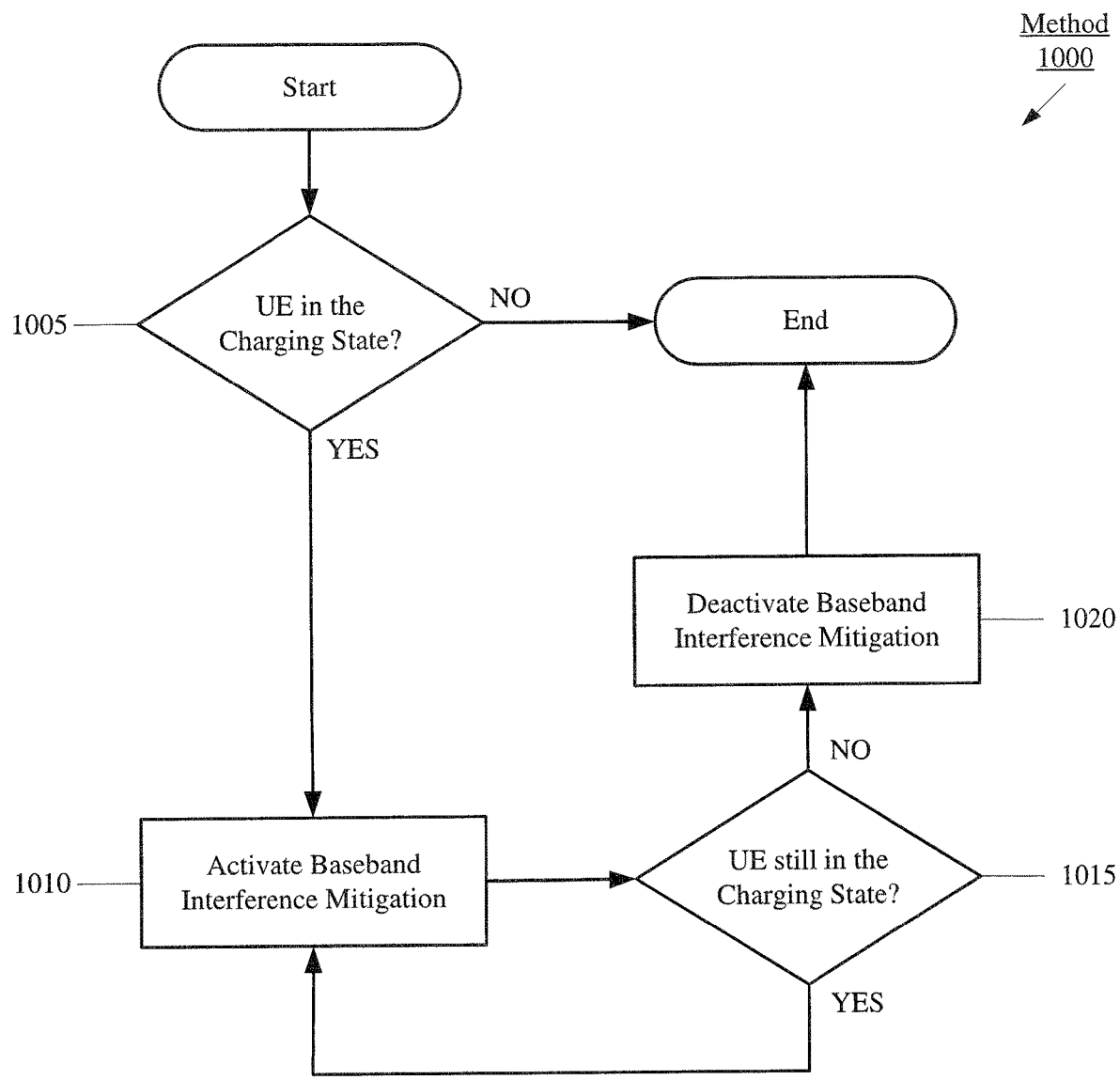
FIG. 10 shows an exemplary method for baseband interference mitigation according to various exemplary embodiments described herein.

FIG. 10 shows an exemplary method for baseband interference mitigation according to various embodiments described herein. Specifically, FIG. 10 shows a method 1000 for activating the baseband interference mitigation when the UE 110 enters the charging state and deactivating the baseband interference mitigation when the UE 110 exits the charging state. It should be noted that method 1000 will be described in reference to the baseband interference mitigations discussed above in the first example of the baseband interference mitigations as well as further baseband interference mitigations discussed below.

In 1005, it is determined whether the UE 110 is in the wireless charging state. If the UE 110 is not in a charging state, the method 1000 may end. If it is determined that the UE 110 is in the wireless charging state, the method 1000 may proceed to 1010.

In 1010, the UE 110 may activate the baseband interference mitigation. For example, as discussed above, the baseband interference mitigation may include deactivating motion sensor based searching, deactivating the BCCH read early timeout, deactivating the UMTS cell avoidance, altering the cell connection parameters of the UE 110 and activating fast mode measurements. Thus, in 1010, any one or combination of these or further baseband interference mitigations may be activated.

In 1015, it is determined whether the UE 110 is still in the wireless charging state. If so, the method 1000 keeps the baseband interference mitigations activated by looping to 1010. If the UE is no longer in the wireless charging state, the method 1000 proceeds to 1020. In 1020, the UE 110 may deactivate the baseband interference mitigation(s), which were activated in 1010. Again, those skilled in the art would understand that any baseband interference mitigation may be deactivated in 1020.

Another example of a baseband interference mitigation that may be activated in 1010 may include enabling one or more additional diversity antennas. For example, the baseband processor of the processor 220 may enable one or more additional diversity antenna(s), upon which the UE 110 may enter a higher-order diversity mode. By enabling one or more diversity antenna(s), the UE 110 may experience improved cell search, system information decoding, and page reception performance while in the charging state.

A further example of a baseband interference mitigation that may be activated in 1010 may include altering a duration of an onDuration of a discontinuous reception ("DRX") or a connected discontinuous reception ("C-DRX"), which may be used interchangeable with the DRX cycle herein. Specifically, when the UE 110 is connected to the cellular network 125, the UE 110 may utilize the DRX cycle to conserve power by using an active mode of processing only during the onDuration of the DRX cycle. Outside of the onDuration, the UE 110 may be in an offDuration, or sleep mode. In 1010, the UE 110 may alter the duration of the DRX cycle by entering the onDuration earlier than scheduled, extending a duration of the onDuration, or eliminating the offDuration, which would keep the UE 110 continuously in the onDuration. Those skilled in the art would understand that any combination of the above examples may be implemented by the UE 110. By altering the duration of the onDuration, the UE 110 may mitigate the interference of the charging station 115 by increasing the duration of its active mode during which transmission may be received. Again, because the UE 110 is in a charging state, the conservation of the battery power is not an immediate concern.

A further example of a baseband interference mitigation that may be activated in 1010 may include increasing an amount of physical broadcasting channel ("PBCH") attempts. The PBCH is usually an extremely reliable channel that typically employs a coding rate less than ⅛. Furthermore, the PBCH may be used to broadcast parameters essential for initial access to the network. In 1010, the UE 110 may increase the amount of PBCH attempts to improve a cell re-selection process and system information decoding performance.

A further example of a baseband interference mitigation that may be activated in 1010 may include altering threshold(s) relating to a panic search and measurement state of the UE 110. The panic search and measurement state of the UE 110 may include more frequent searching/measuring of a neighboring cell. In 1010, by altering the threshold(s) relating to the panic search and measurement state of the UE 110, the UE 110 increases a chance of finding a suitable neighboring cell. Thus, the UE 110 may experience improved cell re-selection and system information decoding performance.

A further example of a baseband interference mitigation that may be activated in 1010 may include extending a search measurement window or a fast measurement. By extending the search measurement window or the fast measurement, the UE may increase a chance of finding or maintaining a connection to the cellular base station 120 and, thus may experience improved cell re-selection and system information decoding performance.

A further example of a baseband interference mitigation that may be activated in 1010 may include increasing a ceiling (cap) of a maximum transmission power of the UE 110. By increasing the ceiling of the maximum transmission power of the UE 110, the UE 110 may experience improved call setup and retainability while in the charging state.

A further example of a baseband interference mitigation that may be activated in 1010 may include increasing a duration of a search length. By increasing the duration of the search length, the UE 110 may search for a neighboring cell, a new frequency or a new band for a greater period of time. At 1010, the UE 110 may extend the search length to improve a chance of locating the neighboring cell, the new frequency or the new band. For example, the processor 220 may extend the search length from 6 ms to 21 ms. Those skilled in the art would understand that the above search lengths are only exemplary, and any search length duration may be increased to any new search length duration.

A further example of a baseband interference mitigation that may be activated in 1010 may include disabling a micro-sleep function or deactivating a physical downlink control channel Only ("PDCCH-Only") mode. The micro-sleep function may use a small sleep interval within a PDCCH-Only subframe, during which the UE 110 does not receive signals, to conserve life of the battery 280 of the UE 110. By disabling the micro-sleep function, the UE 110 may receive signals during times where it would otherwise be sleeping. In this manner, the UE 110 maintains call retainability and decode performance while the UE 110 is in the charging state.

The PDDCH is a physical channel that downlink control information ("DCI"). The DCI may include information about which resources the UE 110 is to use for uplink transmissions. PDCCH-Only is a power saving feature that may be implemented by the UE. Specifically, under certain conditions, the UE 110 may prematurely turn off its transceiver 210 (or receiver and/or transmitter) to conserve battery life. Those skilled in the art would understand that the PDCCH-Only may have multiple variants, such as but not limited to, early PDCCH, only PDCCH, etc. The early PDCCH may include the UE 110 turning off its transceiver 210 when no downlink grant is detected in the PDCCH. The only PDCCH may include the UE 110 turning off its transceiver after a PDCCH is received, regardless of grant information in the PDCCH. Similar to the micro-sleep function, this may improve call retainability and decode performance while the UE 110 is in the charging state.

A further example of a baseband interference mitigation that may be activated in 1010 may include adjusting a threshold(s) of triggering advanced receiver functions. The advanced receiver may refer to the UE 110 enabling advanced techniques. The advanced techniques may include cell reference-symbol interference-cancellation ("CRS-IC") and/or interference-mitigation ("CRS-IM") under a multi-cell scenario to achieve superior downlink performance. The CRS-IC and/or CRS-IM may be enabled when signal interference is strong, such as when a signal to interference ratio ("SIR") is low. Thus, for example, if the SIR, which may be measured in decibels ("dBs"), falls below a threshold, the CRS-IC and/or CRS-IM may be enabled. The interference corrected by CRS-IC and/or CRS-IM may relate to interfering signals of a cell not camped on by the UE 110. At 1010, the processor 220 adjusts the threshold(s) for when the CRS-IC and/or CRS-IM would be enabled. Specifically, the processor 220 may decrease a first threshold for the CRS-IC to be enabled (e.g., increase the SIR required for CRS-IC to be enabled from 2 db to 6 db), increase a second threshold of the CRS-IM to be enabled (e.g., increase the SIR required for CRS-IM to be enabled from 5 db to 10 db) or both. By increasing the thresholds, the UE 110 may enable the CRS-IC and/or CRS-IM when the interference is not as high as normally required. Those skilled in the art would understand that there may be situations where only one of the CRS-IC or the CRS-IM may be functioning at a time. As such, the thresholds of the CRS-IC and CRS-IM may be adjusted accordingly at 1010. It should also be noted that the ARx threshold may include at least one of a colliding interference threshold(s) and/or a non-colliding interference threshold(s) and that the above values for the thresholds are exemplary and only for illustration purposes.

A further example of a baseband interference mitigation that may be activated in 1010 may include deactivating various cellular features designed to limit consumption of the battery 280. For example, the various cellular features may include limiting scheduling requests, limiting uplink hybrid automatic repeat ("HARQ") requests, or limiting channel quality index ("CQI") carryover. By limiting these various cellular features, the UE 110 is able to conserve battery life. At 1010, the processor 220 may alter or deactivate the limiting of the various cellular features. This would allow for the UE 110 to transmit a greater number of scheduling requests, HARQ requests, and perform more CQI carryovers.

A further example of a baseband interference mitigation that may be activated in 1010 may include disabling an optimization of a downlink carrier aggregation ("DL-CA") small cell measurement. The DL-CA small cell measurement optimization may be used to conserve the life of the battery 280 because the UE 110 will not be continuously adjusting DL-CA small cell measurement. In contrast, when the UE 110 is charging, power consumption is not an issue. Thus, in 1010, the processor 220 may disable the DL-CA small cell measurement optimization so that the UE 110 may make as may DL-CA small cell measurements as necessary.

A further example of a baseband interference mitigation that may be activated in 1010 may include disabling a frame early termination ("FET") for a paging channel ("PCH") and/or a paging indicator channel ("PICH"). FET of the PCH and/or PICH may be used to conserve the life of the battery 280 by terminating the frames from the PCH and/or the PICH earlier than required. Thus, in 1010, the processor 220 may disable the FET for the PCH and/or PICH so that more frames are received by the UE 110.

User Intervention Mitigations

Figure 11:
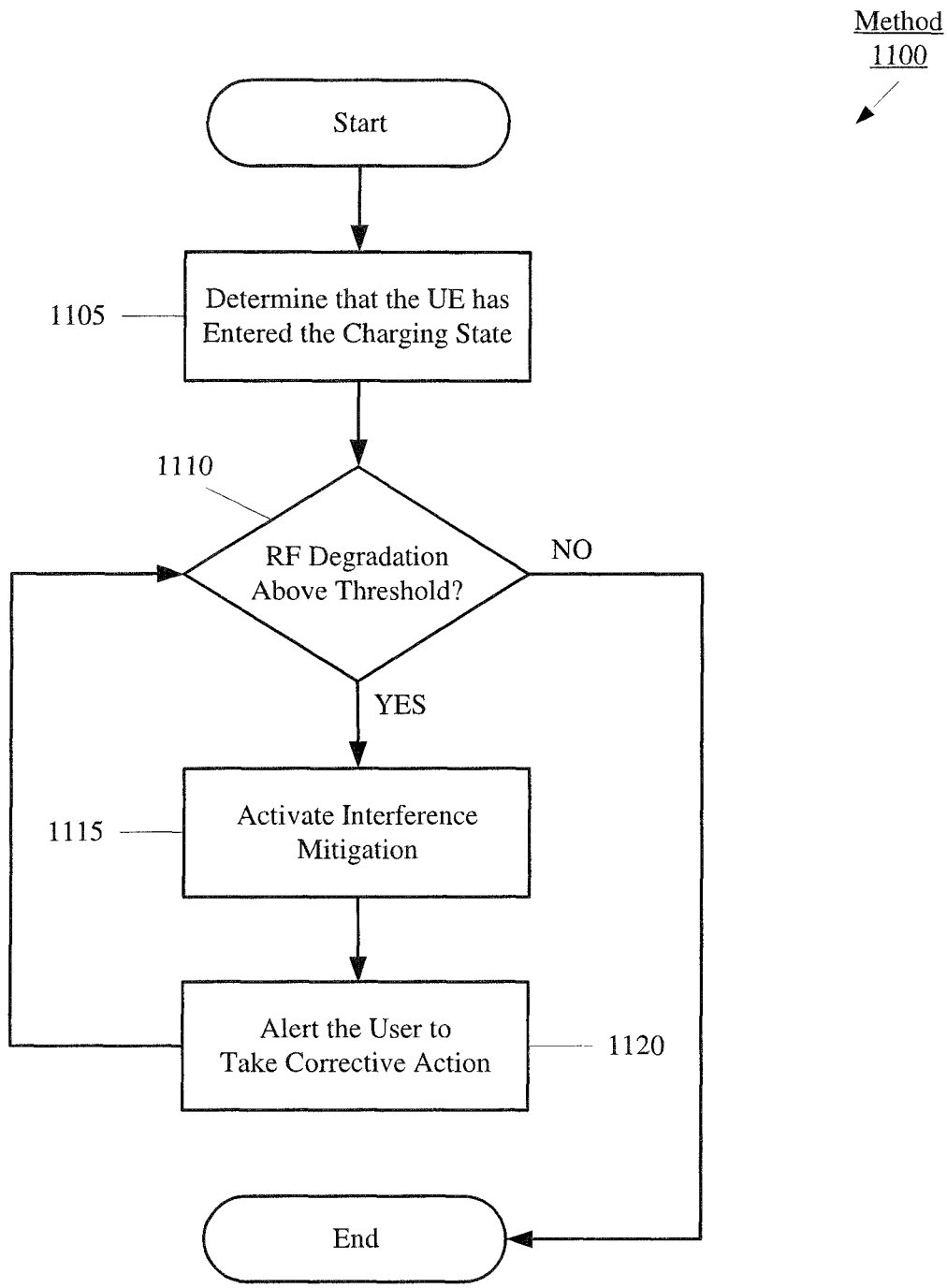
FIG. 11 shows an exemplary method for alerting a user of interference according to various exemplary embodiments described herein

As discussed above, the level of RF degradation may depend on a variety of factors, one of which being the relative orientation of the UE 110 with respect to the wireless charging station 115. In particular, if the user places the UE 110 in a first position and/or orientation, the electromagnetic field generated by the wireless charging station 115 may cause more or less interference than if the UE 110 was placed in a second position/orientation on the wireless charging station 115. This may be because the antenna of the UE 110 may be in a position where the electromagnetic field is stronger than another position on the charging station 115, the electromagnetic wave is parallel and/or perpendicular to the antenna, etc. As such, FIG. 11 shows a method 1100 for alerting the user of the UE 110 when the interference from the charging station 115 is stronger than expected, thus allowing the user to take corrective action (e.g., repositioning the UE 110 on the charging station 115).

In 1105, it is determined that the UE has entered the wireless charging state. As discussed above, the detection application 230 may make this determination based on any number of factors.

In 1110, the UE 110 may determine whether the RF degradation is above a predetermined threshold. Specifically, the UE 110 may initiate a process to determine the RF degradation. In an exemplary embodiment, the process may include at least one of determining current serving cell measurement, determining neighbor cell measurement (e.g., intra-frequency, inter-frequency, inter-RAT, etc.) determining a current camping threshold on a serving cell(s), determining a current camping state of the UE 110 (e.g., if a re-selection is pending, if a re-selection is outgoing, if in an OOS condition, etc.), etc. Once the RF degradation is determined, the RF degradation may be compared to an RF degradation threshold.

It should be understood that UE 110 may enable certain functions when initiating the process to determine the RF degradation. For example, the UE 110 may trigger a faster measurement rate. This would allow for the UE 110 to determine the RF degradation at a quicker pace. It should further be understood that once the RF degradation is determined, the certain functions may be disabled. For example, once the RF degradation is determined, the UE 110 may disable the faster measurement rate and go back to a normal measurement rate.

If the RF degradation does not exceed the RF degradation threshold, the method 1100 may end. If the RF degradation exceeds the RF degradation threshold, the method 1100 may proceed to 1115.

In 1115, the UE 110 may activate an interference mitigation. In an exemplary embodiment, the interference mitigation may be any interference mitigation discussed above (e.g., the protocol stack interference mitigations, the baseband interference mitigations, etc.) It should be understood that implementing step 1115 may be an option and that the method 1100 may proceed directly from 1110 to 1120.

In 1120, the UE 110 may alert the user to take corrective action. In a first exemplary embodiment, the processor 220 may instruct the display device 240 to show the user a visual message, which instructs the user to take corrective action. In a second exemplary embodiment, the processor 220 may produce, via a speaker of the UE 110, an audio alert, such as an alarm sound or a verbal message to take corrective action. This corrective action may be for the user to reposition the UE 110 on the charging station 115 in a different position or orientation. After alerting the user, the method 1100 may proceed to 1110, where it may be determined whether if the user's corrective action decreased the RF degradation. That is, the method 1100 may again determine whether the RF degradation is above the predetermined threshold, and proceed accordingly.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

The invention claimed is:

1. A method, comprising:
    at a user equipment ("UE");
        determining that the UE is in a wireless charging state;
        in response to determining that the UE is in the wireless charging state, activating an interference mitigation, the interference mitigation comprising altering at least one parameter of an operation associated with a layer of a protocol stack for a cellular network connection of the UE;
        determining that the UE exits the wireless charging state; and
        in response to determining that the UE exits the wireless charging state, deactivating the interference mitigation, wherein the deactivating the interference mitigation comprises restoring the at least one parameter from a wireless charging state value to a wireless non-charging state value.

2. The method of claim 1, wherein the activating of the interference mitigation is further based on whether the UE is connected to a cellular network.

3. The method of claim 1, wherein the at least one parameter includes at least one of an access barring factor, a cell selection criteria, an out of service ("OOS") recovery scan rate, a duration of an onDuration of a discontinuous reception ("DRX") cycle, an amount of physical broadcasting channel ("PBCH") decoding attempts, a threshold of a panic search and measurement state, a search and measurement window duration, a ceiling of a maximum transmission power limit of the UE, a search length duration or a threshold triggering advanced receiver functions.

4. The method of claim 3, wherein the operation is related to an establishment failure, a connected state radio link failure ("RLF") or a system information block ("SIB") decode failure.

5. The method of claim 1, wherein the interference mitigation comprises one of deactivating a motion sensor based searching, deactivating a broadcast control channel ("BCCH") read early timeout, deactivating UMTS cell avoidance, deactivating a micro-sleep function, deactivating a physical downlink control channel Only ("PDCCH-Only") mode, deactivating a limiting of scheduling requests, deactivating a limiting of channel quality index ("CQI") carryover, deactivating a limiting of uplink hybrid automatic repeat ("HARQ") requests, deactivating an optimization of a downlink carrier aggregation ("DL-CA") small cell measurement, deactivating a frame early termination ("FET") for a paging channel ("PCH") or a paging indicator channel ("PICH") or enabling one or more additional diversity antennas.

6. The method of claim 1, wherein the interference mitigation comprises performing one of a type of quick scan, a fast mode measurement or a fingerprint function, wherein the type of quick scan includes one of a better system reselection (BSR) scan, a force better system scan, a most recently used (MRU) scan or a sector level sweep (SLS) scan.

7. The method of claim 1, further comprising:
    in response to the UE exiting the wireless charging state, activating a further interference mitigation.

8. The method of claim 7, wherein the further interference mitigation includes one of a type of quick scan, a removing of a throttling timer, or a high priority public land mobile network ("HP-PLMN") scan, wherein the type of quick scan includes one of a better system reselection (BSR) scan, a force better system scan, a most recently used (MRU) scan or a sector level sweep (SLS) scan.

9. The method of claim 1, wherein the interference mitigation comprises removing one of a radio access technology ("RAT"), a cell or a frequency from a deprioritized list.

10. The method of claim 1, further comprising:
    determining a level of interference at the UE;
    determining the level of interference is above a predefined threshold; and
    in response to determining the level of interference is above the predefined threshold, initiating a further interference mitigation.

11. A user equipment ("UE"), comprising:
    a transceiver configured to connect to a base station of a network; and
    a processor configured to:
        determine that the UE is in a wireless charging state; and
        in response to determining that the UE is in the wireless charging state, activate an interference mitigation, the interference mitigation comprising altering at least one parameter of an operation associated with a layer of a protocol stack for a cellular network connection;
        determine that the UE exits the wireless charging state; and
        in response to determining that the UE exits the wireless charging state, deactivating the interference mitigation, wherein the deactivating the interference mitigation comprises restoring the at least one parameter from a wireless charging state value to a wireless non-charging state value.

12. The UE of claim 11, wherein the processor is further configured to:
    determine when the UE exits the wireless charging state; and
    deactivate the interference mitigation when it is determined that the UE exited the wireless charging state.

13. The UE of claim 12, wherein when the UE exits the wireless charging state, the processor is further configured to activate a further interference mitigation, the further mitigation includes one of a type of quick scan, a removing of a throttling timer, or a high priority public land mobile network ("HP-PLMN") scan, wherein the type of quick scan includes one of a better system reselection (BSR) scan, a force better system scan, a most recently used (MRU) scan or a sector level sweep (SLS) scan.

14. The UE of claim 11, wherein the processor is further configured to activate the interference mitigation based on whether the UE is connected to a cellular network.

15. The UE of claim 11, wherein the at least one parameter comprises at least one of an access barring factor, a cell selection criteria, an out of service ("OOS") recovery scan rate, a duration of an onDuration of a discontinuous reception ("DRX") cycle, an amount of physical broadcasting channel ("PBCH") decoding attempts, a threshold of a panic search and measurement state, a search and measurement window duration, a ceiling of a maximum transmission power limit of the UE, a search length duration or a threshold triggering advanced receiver functions.

16. The UE of claim 11, wherein the interference mitigation comprises one of deactivating a motion sensor based searching, deactivating a broadcast control channel ("BCCH") read early timeout, deactivating UMTS cell avoidance, deactivating a micro-sleep function, deactivating a physical downlink control channel Only ("PDCCH-Only") mode, deactivating a limiting of scheduling requests, deactivating a limiting of channel quality index ("CQI") carry-over, deactivating a limiting of uplink hybrid automatic repeat ("HARQ") requests, deactivating an optimization of a downlink carrier aggregation ("DL-CA") small cell measurement, deactivating a frame early termination ("PET") for a paging channel ("PCH") or a paging indicator channel ("PICH") or enabling one or more additional diversity antennas.

17. The UE of claim 11, wherein the interference mitigation comprises performing one of a type of quick scan, a fast mode measurement or a fingerprint function, wherein the type of quick scan includes one of a better system reselection (BSR) scan, a force better system scan, a most recently used (MRU) scan or a sector level sweep (SLS) scan.

18. The UE of claim 11, wherein the interference mitigation comprises removing one of a radio access technology ("RAT"), a cell or a frequency from a deprioritized list.

19. An integrated circuit, comprising:
circuitry configured to determine when a user equipment ("UE") enters a wireless charging state;
circuitry configured to activate an interference mitigation when it is determined that the UE entered the wireless charging state, the interference mitigation comprising altering at least one parameter of an operation associated with a layer of a protocol stack for a cellular network connection of the UE, the network connection being affected by the wireless charging state;
circuitry configured to determine when the UE exits the wireless charging state; and
circuitry configured to deactivate the interference mitigation when it is determined that the UE exited the wireless charging state, wherein the deactivating the interference mitigation comprises restoring the at least one parameter from a wireless charging state value to a wireless non-charging state value.

\* \* \* \* \*